Nov. 22, 1960    J. W. PHILIPPOVIC    2,961,213
ADJUSTABLE LOCK FOR IRIS VALVE
Filed Sept. 2, 1953
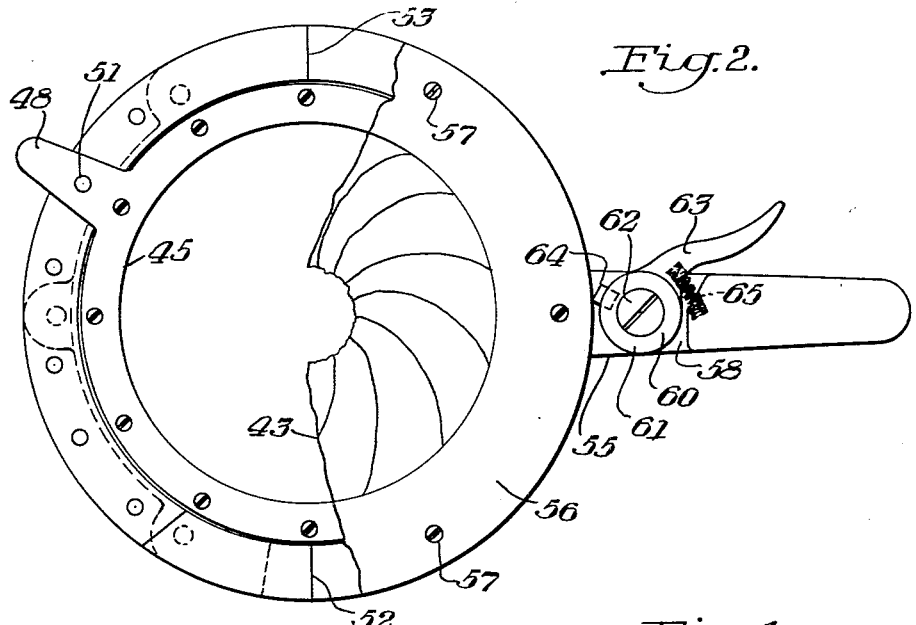
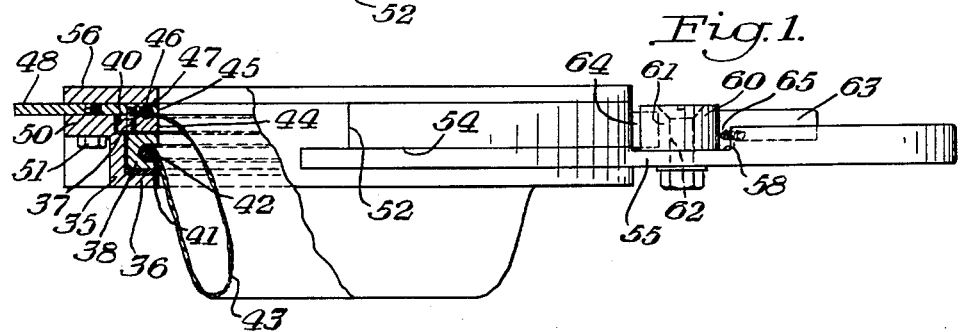
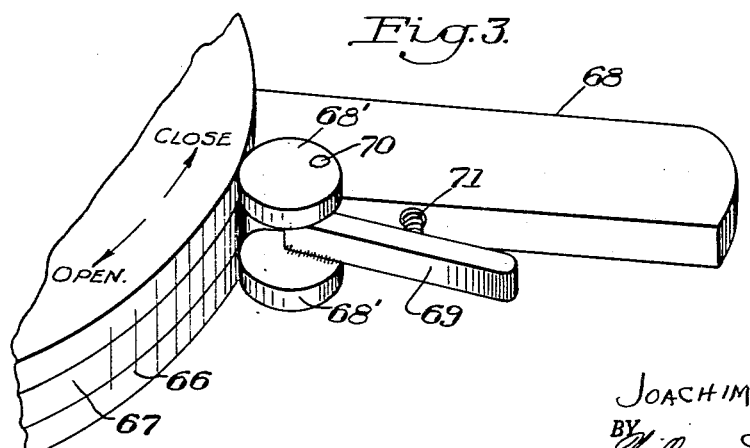
INVENTOR.
JOACHIM WOLFGANG PHILIPPOVIC
BY
William D. Carothers
His Attorney United States Patent Office 2,961,213
Patented Nov. 22, 1960

2,961,213

ADJUSTABLE LOCK FOR IRIS VALVE

Joachim Wolfgang Philippovic, Indiana, Pa., assignor to Syntron Company, Homer City, Pa., a corporation of Delaware Filed Sept. 2, 1953, Ser. No. 378,044

4 Claims. (Cl. 251—4)

This invention relates generally to valves and more particularly to an iris valve formed by a flexible sleeve having its ends secured to rings movable relative to each other within the throat being controlled.

The principal object of this invention is the provision of an iris valve having locking means to hold the valve in any desired position between its fully open position to its fully closed position. This locking means may be obtained by providing a handle that screws against the body of the valve or it may be a rotary cam type that exerts greater pressure against the body owing to the eccentricity of the cam. This type of lock is always effective as a spring may be employed to urge the cam into locking position and prevents the operating lever from being moved toward the open position of the valve but always permits the operating lever to move the valve toward its closed position even with considerable spring pressure on the locking device.

Iris valves of this character may be constructed with one or two sleeves. The sleeves can be separately adjusted so that the iris formed by each sleeve may be adjusted to provide the same tautness at its closed position so that each valve assumes part of the load on the valve. These valves are usually placed on the bottom of a chute on the lower end of a hopper or bin and the load produced by the material in the bin is directly on the valve. The second sleeve may be adjusted to be loosely closed when the first sleeve is tight and thus function as an auxiliary valve.

To increase the frictional engagement between the locking members and the body of the valves, a composition of rubber or other similar material may be used between the contacting surfaces. This material may be on the body of the valve or on the locking member, however, the cam locking device with a spring biased pressure needs no additional friction as a cam of low spiral degree is all that is necessary.

Other objects and advantages appear hereinafter in the following description and claims.

The accompanying drawings show for the purpose of exemplification without limiting the invention or claims thereto, certain practical embodiments illustrating the principles of this invention wherein:

Fig. 1 is a view partly in elevation and partly in section showing a single sleeve iris valve with a helical cam lock and an adjusting lever.

Fig. 2 is a view partly in plan and partly in horizontal section of the structure shown in Fig. 3.

Fig. 3 is a detailed view of another type of eccentric cam lock.

In the structure shown in Figs. 1 and 2 the casing 35 has two offsets 36 and 37 which form the bearing seats for the rings 38 and 40. The ring 38 has an annular groove 41 in its bore to receive the small ring 42 around which one end of the valve sleeve 43 is wrapped and thus secured. The ring 42 can be of the split type and thus tightly hold the end of the sleeve in place.

The ring 40 is made in two parts, the rings 44 and 45 which have an annular socket 46 to retain the wire ring 47 that holds the other end of the sleeve 43. The ring parts 44 and 45 clamp together to hold the ring 47 and the sleeve in place.

A handle or sleeve adjusting arc 48 is provided on the ring 45 and a series of holes are provided in the flange 50 of the housing 35 to receive the screw 51 which locks the handle or sleeve adjusting lever 48 in any selected position to fix the point at which the stationary end of the sleeve 43 is secured. By adjusting the lever 48 in different angular positions the iris valve may be made to close before the operating handle hits the stop 52 or the closed position. The stop 53 at 180° is the fully open position of the valve. These stops are formed on the casing 35 at opposite ends of the slot 54 through which the opening handle 55 extends.

The top of the casing 35 is closed by the lid 56 which is secured to the body 35 by the screws 57.

An annular angle may be used to secure this valve at the ends of a chute or hopper.

The handle 55 has an offset 58 to receive the locking lever 60 which comprises an annular bushing 61 journaled on a stud 62 and having a trigger 63 formed integral therewith. A recess in the perimetral face of the bushing has the resilient shoe 64 mounted therein for engagement with the outer perimetral face of the housing 35. Since the shoe 64 extends beyond the surface of the bushing it cannot pass the line between the center of its pivot of the stud 62 and the center of the valve but jams between these surfaces and locks the valve against moving toward the stop 53 at the open valve position. The spring 65 urges the trigger 63 to constantly force the shoe 64 into frictional engagement with the housing 35 to lock the valve at the position in which the handle is permitted to rest.

The structure shown in Fig. 3 provides a valve housing 66 having a slot 67 through which the handle 68 extends. The lock member comprises spaced disks 68' which are integrally connected by the trigger member 69. These disks are pivotally mounted on the handle by the pivot member 70 which is eccentrically mounted relative to perimetral surfaces of the disks. Thus the disks present cam surfaces to engage the perimetral surfaces of the valve casing 66. The spring 71 urges the trigger 69 outwardly forcing the cam surfaces of the disks into locking engagement preventing the valve from opening any further than its set position.

It is understood that the invention disclosed and claimed herein is not limited in its application to the details of construction and arrangement of parts illustrated in the accompanying drawings since the invention is capable of other embodiments and of being practiced or carried out in various ways.

I claim:

1. An iris valve comprising a body having an annular throat, a pair of rings rotatably mounted adjacent each other in said throat, a flexible sleeve having its ends secured to said rings to provide a passage through said throat, an adjusting lever on the first ring, an operating lever on the second ring, spaced stops on said body to limit the movement of said operating lever, and means to adjustably fasten the first ring relative to said body and to adjustably fasten said second ring relative to said body to control the degree of closing of the iris valve in any position between said stop limits.

2. The structure of claim 1 which also includes a friction lock carried by said operating lever and engaging said body to hold the second ring in any position between the stop limits and thus control the size of the opening in said valve.

3. A lock for an iris valve in a body having rotatably mounted therein at least two rings attached in spaced relation to a flexible sleeve with means to hold the first ring relative to the second ring to determine the maximum and minimum of the iris valve opening and an operating handle means secured to and projecting from the second ring to adjust the opening and closing of the iris valve in a selected position, characterized by a friction lock carried by said operating handle means and having a positive release wedge type clamping member to engage the exterior of said body and hold the operating handle means and the iris valve in any adjusted position and a control means attached to said first ring and projecting from said body to rotate said ring and vary the maximum and minimum opening of the iris valve.

4. An iris valve for controlling bulk material comprising a valve body having an axial throat with an annular seat means, a plurality of rings mounted for independent rotation in said annular seat means, a flexible sleeve, attaching means securing spaced portions of said sleeve to said rings to produce an iris in said sleeve when there is relative rotary movement between said rings, means to set the rotary position of the first ring relative to the second ring to determine the maximum and minimum opening of the iris, handle means attached to rotate the second ring to vary the iris to said maximum and minimum opening set by said means of said first ring, friction lock means for each ring effective on said valve body to arrest the iris at any desired opening, said locking means and a wedge mounted to apply greater locking pressure against the housing to oppose increased force of the bulk material on the iris, said means to set the rotary position of the first ring includes an exterior handle on said first ring.

References Cited in the file of this patent

UNITED STATES PATENTS

| | | |
|---|---|---|
| 1,076,802 | White | Oct. 28, 1913 |
| 1,205,031 | Schmitt | Nov. 14, 1916 |
| 1,870,557 | Curd | Aug. 9, 1932 |
| 1,986,484 | Schlueter | Jan. 1, 1935 |
| 2,035,747 | Harris | Mar. 31, 1936 |
| 2,321,336 | Tondreau | June 8, 1943 |
| 2,629,606 | Fraser | Feb. 24, 1953 |
| 2,663,467 | Douglass | Dec. 22, 1953 |

FOREIGN PATENTS

| | | |
|---|---|---|
| 634,975 | Great Britain | of 1950 |
| 806,757 | Germany | June 18, 1951 |

UNITED STATES PATENT OFFICE

CERTIFICATION OF CORRECTION

Patent No. 2,961,213             November 22, 1960

Joachim Wolfgang Philippovic

It is hereby certified that error appears in the above numbered patent requiring correction and that the said Letters Patent should read as corrected below.

Column 4, line 4 for "and" read -- has --.

Signed and sealed this 2nd day of May 1961.

(SEAL)
Attest:

ERNEST W. SWIDER
Attesting Officer

DAVID L. LADD
Commissioner of Patents